United States Patent
Silveri et al.

(10) Patent No.: US 7,828,694 B2
(45) Date of Patent: Nov. 9, 2010

(54) ROLLBACK CONTROL OF A HYBRID ELECTRIC VEHICLE

(75) Inventors: Andrew J. Silveri, Royal Oak, MI (US); Ihab S. Soliman, Warren, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 740 days.

(21) Appl. No.: 11/893,575

(22) Filed: Aug. 16, 2007

(65) Prior Publication Data

US 2009/0048063 A1 Feb. 19, 2009

(51) Int. Cl.
*B60K 1/02* (2006.01)
*F16H 59/00* (2006.01)
*F02D 29/06* (2006.01)

(52) U.S. Cl. .............. 477/3; 477/98; 477/905; 290/40 C

(58) Field of Classification Search ............ 477/3, 477/97, 98, 905; 180/65.28, 65.285; 290/40 C
See application file for complete search history.

(56) References Cited

U.S. PATENT DOCUMENTS

| | | | | |
|---|---|---|---|---|
| 5,376,869 | A * | 12/1994 | Konrad | 318/587 |
| 5,842,534 | A * | 12/1998 | Frank | 180/65.25 |
| 6,278,916 | B1 * | 8/2001 | Crombez | 701/22 |
| 6,321,144 | B1 * | 11/2001 | Crombez | 701/22 |
| 6,590,299 | B2 * | 7/2003 | Kuang et al. | 290/40 C |
| 6,960,152 | B2 * | 11/2005 | Aoki et al. | 477/3 |
| 2003/0085576 | A1 | 5/2003 | Kuang et al. | |
| 2007/0278021 | A1 * | 12/2007 | Pott et al. | 180/65.2 |
| 2009/0054200 | A1 * | 2/2009 | Soliman et al. | 477/5 |
| 2009/0062061 | A1 * | 3/2009 | Silveri et al. | 477/5 |
| 2009/0093337 | A1 * | 4/2009 | Soliman et al. | 477/5 |
| 2009/0233760 | A1 * | 9/2009 | Silveri et al. | 477/3 |

FOREIGN PATENT DOCUMENTS

EP 1826088 A2 8/2007

* cited by examiner

*Primary Examiner*—Roger Pang
(74) *Attorney, Agent, or Firm*—David Kelley; MacMillan, Sobanski & Todd, LLC

(57) ABSTRACT

In a powertrain that includes an engine driveably connected to a load and an electric machine driveably connected to the load, a method for controlling a vehicle located on an incline against rollback includes determining a magnitude of wheel torque required to prevent the vehicle from rolling back, determining whether the electric machine has a current torque capacity that is equal to or greater than the required wheel torque, using the electric machine to produce the required wheel torque provided the current torque capacity of the electric machine is able to produce the required wheel torque, and using the engine to produce the required wheel torque provided the torque capacity of the electric machine is unable to produce the required wheel torque.

14 Claims, 7 Drawing Sheets

ROLLBACK CONTROL OF A HYBRID ELECTRIC VEHICLE

BACKGROUND OF THE INVENTION

1. Field of the Invention

This invention relates generally to a powertrain for a hybrid electric vehicle (HEV) having an engine, an electric machine and a multiple-speed, powershift transmission. In particular, the invention pertains to using the powertrain to prevent rollback of the vehicle on an incline.

2. Description of the Prior Art

A powershift transmission is an example of a power transmission for a motor vehicle in which there is no torque-converter. A powershift transmission is a geared mechanism producing multiple gear ratios in forward drive and reverse drive and having two input clutches, which connect a power source, such as an engine or electric motor, to two transmission shafts. A powershift transmission transmits power alternately to the two shafts using synchronized clutch-to-clutch shifts.

A powershift transmission incorporates gearing arranged in a dual layshaft configuration between the transmission input and its output. One input clutch transmits torque between the input and a first layshaft associated with even-numbered gears; the other input clutch transmits torque between the transmission input and a second layshaft associated with odd-numbered gears. The transmission produces gear ratio changes by alternately engaging a first input clutch and running in a current gear, disengaging the second input clutch, preparing a power path in the transmission for operation in the target gear, disengaging the first clutch, engaging the second clutch and preparing another power path in the transmission for operation in the next gear.

In a motor vehicle whose powertrain includes a powershift transmission the vehicle has a tendency to rollback when the driver depresses the accelerator pedal (called a tip-in) following a hill-hold condition, in which the vehicle is held stationary on an incline with or without use of the wheel brakes. The rollback condition is caused by delay in starting the engine in the case where engine is shut down, delay in engine torque due to charging the intake manifold and cylinders with a combustible fuel/air mixture, and delay in producing input clutch torque capacity. These and other delays cause delay in producing wheel torque sufficient to hold the vehicle against rollback on an incline.

When a HEV comes to a stop and the battery's state of charge (SOC) is sufficient and other conditions are met, the engine is shut off. The engine could also be shut off during a hill-hold condition since the vehicle is stopped. Hill holding a HEV occurs with the driver holding the vehicle by applying the wheel brakes, or, if the wheel brakes are released, an electric machine can provide hill-holding wheel torque.

Rollback prevention is required when the vehicle operator then depresses the accelerator pedal (called a tip-in) and expects to ascend the hill. If the engine is to provide torque to the wheels to launch the vehicle, a delay occurs before wheel torque increases sufficiently due to the delays in engine starting, manifold filling and input clutch activation. Rollback can also occur when a vehicle is ascending a hill and the wheel torque does not meet the increased road load due to increasing grade.

There is a need in the industry for a technique that eliminates unintended rollback of the vehicle when (1) the vehicle operator tips-in to accelerate the vehicle on an uphill grade from a stationary vehicle condition while the engine is shutdown; (2) the vehicle operator tips-in to accelerate the vehicle on an uphill grade from a stationary vehicle condition while the engine is running; and (3) when the ERAD is the only available torque source while the engine is shutdown and the vehicle is ascending a hill and the current wheel torque capacity does not meet the increased road load.

SUMMARY OF THE INVENTION

In a powertrain that includes an engine driveably connected to a load and an electric machine driveably connected to the load, a method for controlling a vehicle located on an incline against rollback includes determining a magnitude of wheel torque required to prevent the vehicle from rolling back, determining whether the electric machine has a current torque capacity that is equal to or greater than the required wheel torque, using the electric machine to produce the required wheel torque provided the current torque capacity of the electric machine is able to produce the required wheel torque, and using the engine to produce the required wheel torque provided the torque capacity of the electric machine is unable to produce the required wheel torque.

Rollback prevention is provided by the ERAD for a vehicle that is initially stationary on an uphill grade as the driver tips into the accelerator pedal. The ERAD quickly provides torque that is transmitted to the wheels to avoid rollback. If the ERAD torque capability does not meet or exceed road load or if the thermal limitation of ERAD occurs, the engine is started and its output torque is blended with that of the ERAD.

As the vehicle begins to decelerate due to an increase in the road load caused by increasing grade, the vehicle operator further tips into the accelerator pedal to continue accelerating the vehicle on the incline. A control algorithm interprets the increased accelerator pedal rate as an indication of increasing road load. The combination of increasing accelerator pedal rate and decreasing vehicle speed rate are used to infer that the operator is increasing the pedal position in order to overcome the increase road slope. If the wheel torque provided by the ERAD is not adequate to maintain vehicle acceleration, the engine is started to prevent a vehicle rollback condition.

Finally, ERAD torque is blended off synchronously while engine torque increases, thereby maintaining a constant wheel torque. This provides an undetected transition as the engine is used for vehicle propulsion while preventing vehicle rollback.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
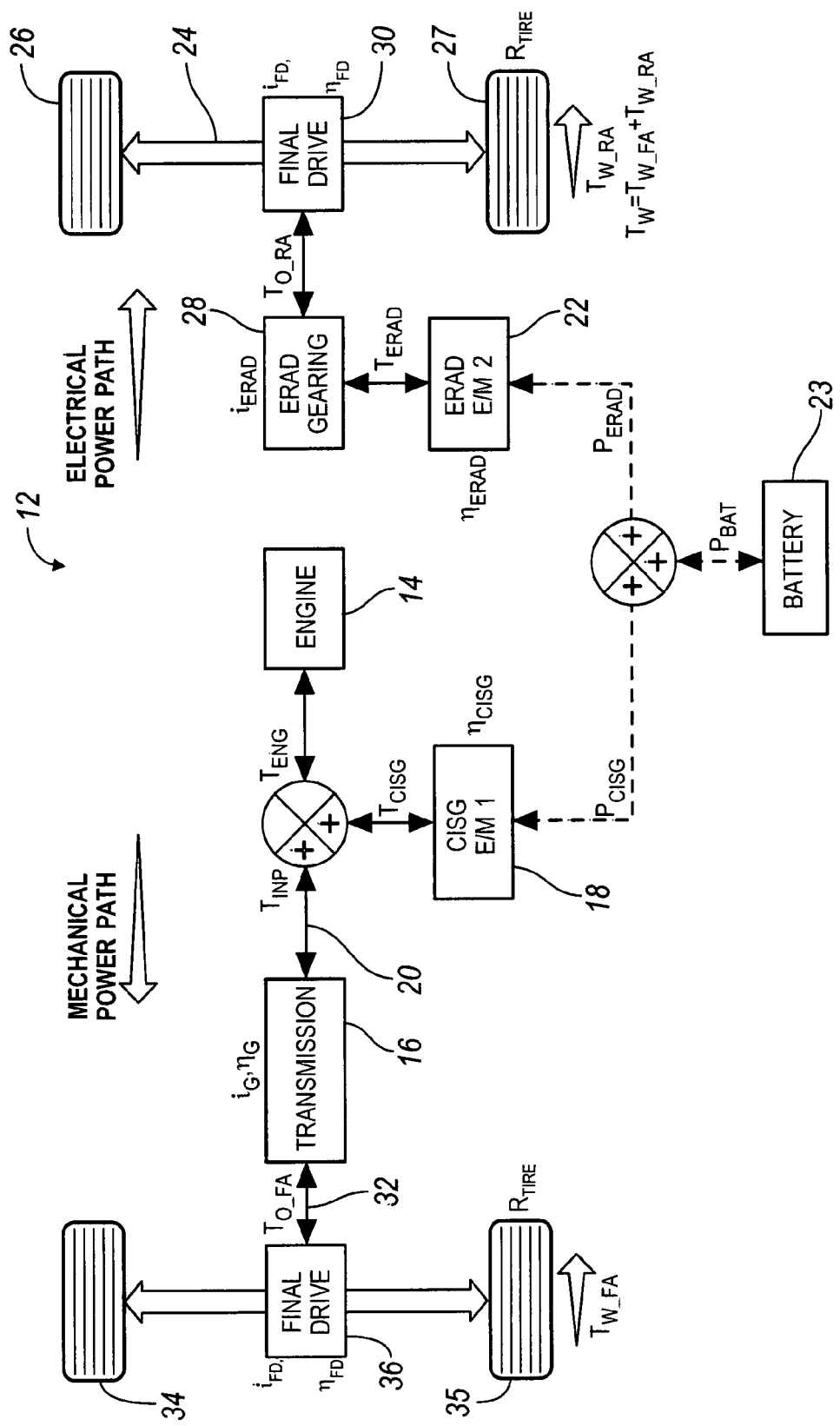
FIG. 1 is a schematic diagram of a vehicle powertrain to which the control can be applied.
Figure 2:
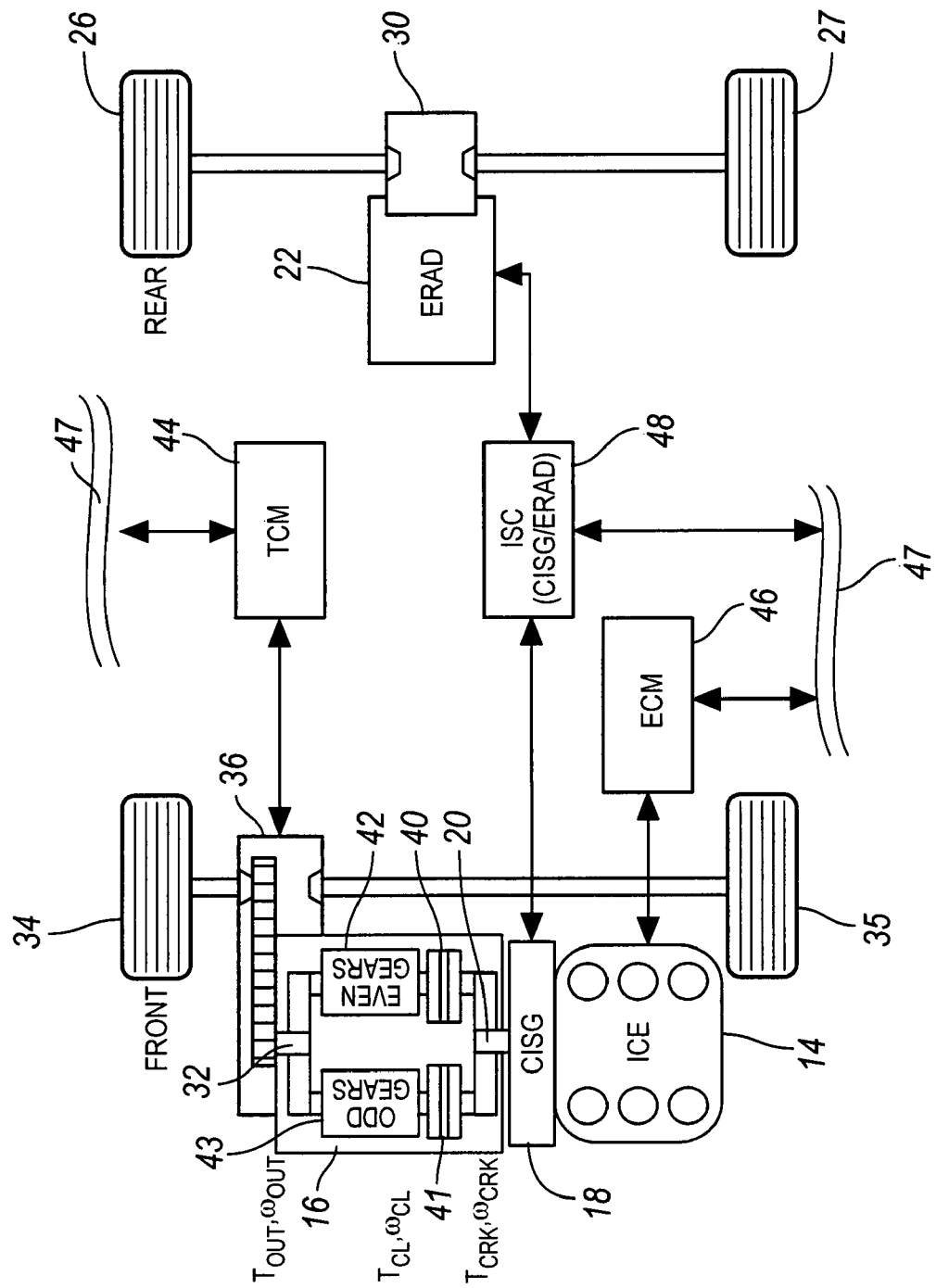
FIG. 2 is a schematic diagram showing additional details of the vehicle powertrain of FIG. 1.

As shown in FIGS. 1 and 2, a vehicle powertrain 12 includes an engine 14, such as a diesel or gasoline engine; a transmission 16, such as dual wet clutch powershift transmission or another multiple ratio transmission having no torque converter; an electric machine 18, such as an CISG driveably connected to the transmission input 20; and an additional electric machine 22, such as an electric motor. Electric machine 18 provides rotating power to crank engine 14 when starting the engine and generates electric power, which is supplied directly to machine 22, or to an electric storage battery 23 or to both of these.

Electric machine 22, sometimes referred to as an electric rear axle drive unit (ERAD), is connected to the final drive of a rear axle 24 and provides propulsion capability in either an electric drive or hybrid (series/parallel) drive mode. Power output by the electric machine 22 drives vehicle wheels 26, 27 through ERAD gearing 28 and a final drive unit 30, which is in the form of an inter-wheel differential mechanism. Similarly, the transmission output 32 is driveably (mechanically) connected to vehicle wheels 34, 35 through a final drive unit 36, which includes an inter-wheel differential mechanism. In front wheel drive (FWD) applications, electric machine 22 could be driveably connected to the final drive 36 of the front axle at the output 32 of the transmission 16, in which case it is referred to as an electric front axle drive (EFAD) unit.

FIG. 2 illustrates the input clutches 40, 41, which selective connect the input shaft 20 of transmission 16 alternately to the even-numbered gears 42 and odd-numbered gears 43; an electronic transmission control module (TCM) 44, which controls the input clutches and gearbox state through command signals to servos or solenoids that actuate the input clutches and gearbox shift forks/synchronizers; an electronic engine control module (ECM) 46, which controls operation of engine 14; and an ISC 48, which controls the CISG and ERAD operations. A vehicle control system (VCS), which is not shown, issues control commands to the TCM and ECM. Each of the VCS, TCM and ECM includes a microprocessor accessible to electronic memory and containing control algorithms expressed in computer code, which are executed repeatedly at frequent intervals. Data communication among the control modules, ECM 46, VSC, TCM 44 and ISC 48 is carried on a communications bus 47.

Powertrain 12 includes two power paths to the load, a mechanical path and an electrical path. Power produced by engine 14 is transmitted through transmission 16 and final drive 36 in the mechanical power path to wheels 34, 35. Power produced by ERAD 22 is transmitted through ERAD gearing 28 and final drive 30 in the electrical propulsion path to wheels 26, 27.

Figure 3:
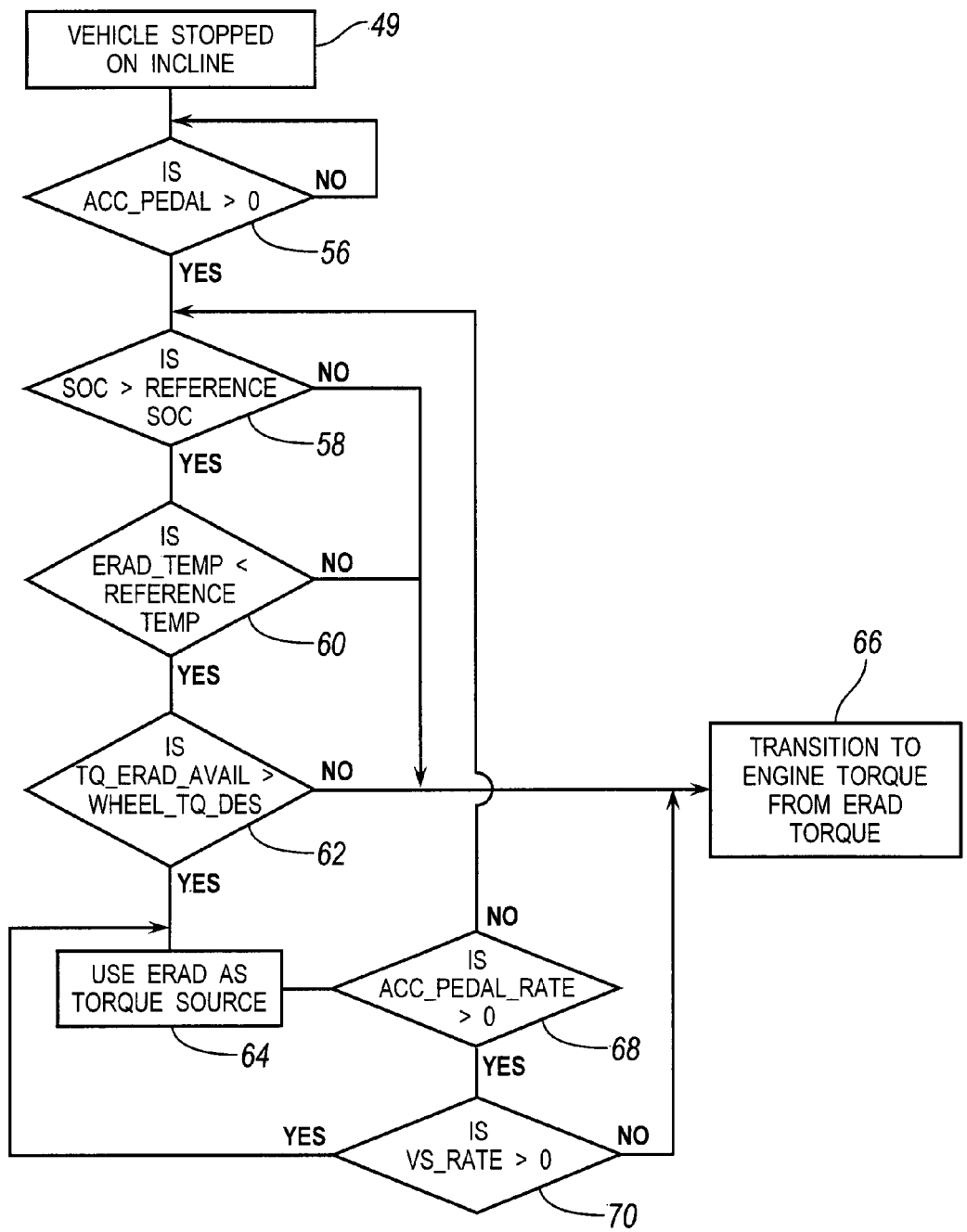
FIG. 3 illustrates the steps of a control method for preventing vehicle rollback.

FIG. 3 illustrates the steps of control algorithm for preventing rollback when the vehicle is either stationary or driven by ERAD 22 with the engine 14 initially shutdown. The control algorithm is called for execution by the controller at step 49 when conditions indicate that the vehicle is stopped on an incline.

Figure 4:
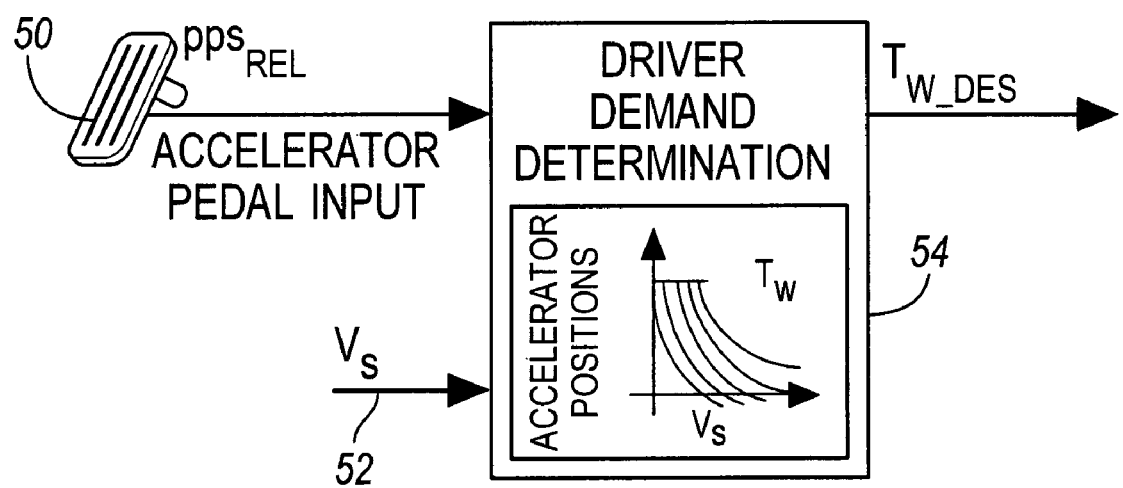
FIG. 4 is a schematic diagram showing a function for determining required wheel torque.

As FIG. 4 shows, the vehicle operator's demand for wheel torque is represented by the degree to which the engine accelerator pedal 50 is depressed, usually referred to as accelerator pedal position, pps. An electronic signal representing the accelerator pedal position produced by a pps sensor and an electronic signal representing the current vehicle speed (VS) 52 produced by a shaft speed sensor, are received as input by a driver demand determination function 54, accessible to the processor in electronic memory, the function being indexed by the two input variables VS and pps and producing as its output the current desired wheel torque $T_{W\_DES}$.

At 56, a test is made to determine whether the accelerator pedal position is greater than zero or a reference pedal position. If the result of test 56 is logically true, control passes to 58. If the result of test 56 is false, control returns to 56.

At 58, a test is made to determine whether the battery's state of charge (SOC) is greater than a reference SOC. If the result of test 58 is true, control passes to 60, where a test is made to determine whether the temperature of ERAD 22 is less than a reference temperature. If the result of test 60 is true, control passes to 62, where a test is made to determine whether the current torque producing capacity of ERAD 22 is greater than the desired wheel torque determined from function 54.

Figure 5A:
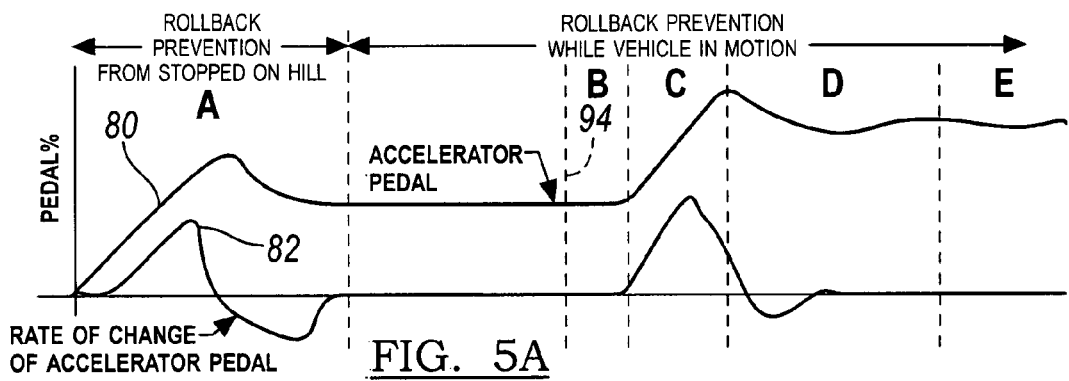
FIGS. 5A-5D show the variation over time of accelerator pedal position, ERAD torque, engine torque, wheel torque, road load, vehicle speed and battery SOC while vehicle rollback is controlled.
Figure 5B:
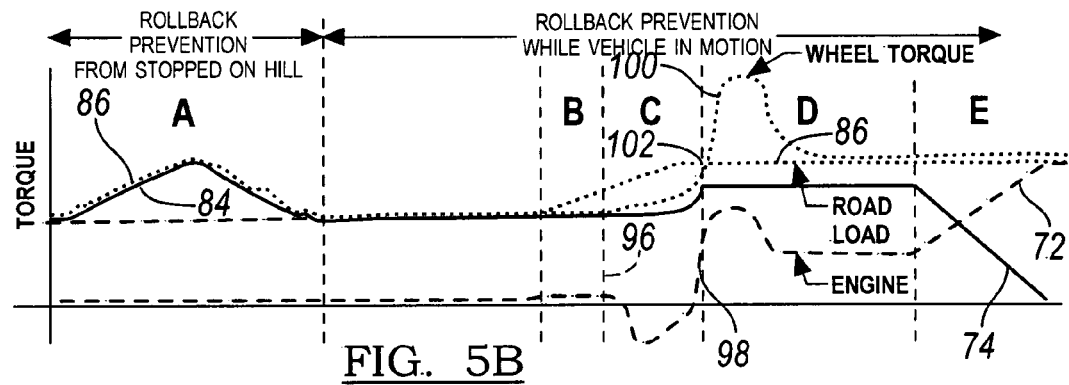

Provided the pedal position is depressed, the battery's SOC is above the reference SOC, the ERAD temperature is below a reference temperature, and the ERAD torque producing capacity is greater than the desired wheel torque, ERAD 22 and the electric power path are used at 64 to drive the wheel load, prevent vehicle rollback, and ascend an uphill grade without starting the engine. But if the result of any of tests 58, 60 and 62 is false, control advances to step 66 where engine 14 and the mechanical power path are used to drive the wheel load and prevent vehicle rollback. At step 66, ERAD torque is decreased synchronous to engine torque increase until engine torque provides the required wheel torque. Preferably, as shown in FIG. 5B, ERAD torque is controlled so that the summation with engine torque continually and smoothly provides the required wheel torque.

While ERAD 22 and the electric power path are being used to prevent rollback, the control algorithm repetitively performs test 68 at frequent intervals to determine whether the rate of change of accelerator pedal position is greater than zero or a reference pedal position rate. If the result of test 68 is logically true, the algorithm repetitively performs test 70 at frequent intervals to determine whether the rate of change of vehicle speed VS is greater than zero or a reference vehicle speed change rate. If the result of test 70 is true, control returns to 64.

If the result of test 68 is false, indicating that the accelerator pedal position is not changing or is changing slowly, the control assumes that ERAD torque is preventing vehicle rollback, and control returns to 58.

If the result of test 70 is false, indicating that the vehicle acceleration is not increasing or is decreasing rapidly, the control assumes that ERAD torque is not preventing vehicle rollback, and control passes to 66, where engine 14 and the mechanical power path are used to drive the wheel load and prevent vehicle rollback. The combination of test 68 and test 70 is used by the control to infer that the driver is depressing the accelerator pedal to overcome an increase in road load due to an increase in grade and that torque at the wheels is not adequate to maintain vehicle acceleration. Tests 68 and 70 provide the earliest indication of a rollback condition.

Figure 5C:
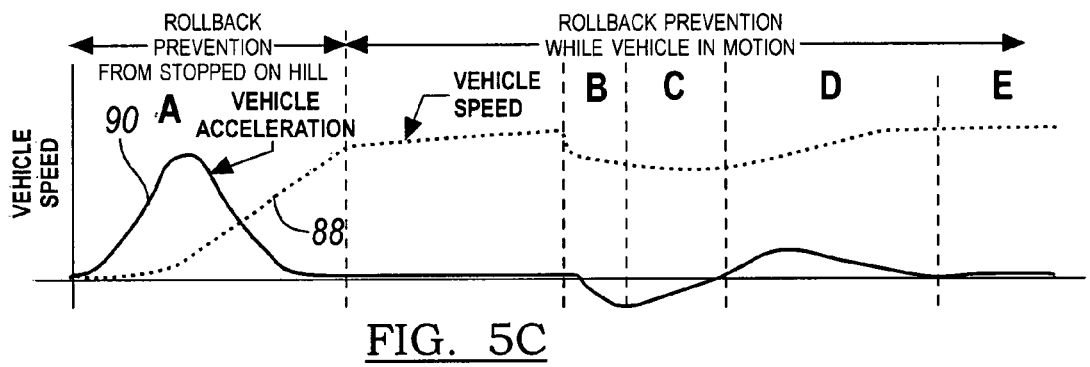
Figure 5D:
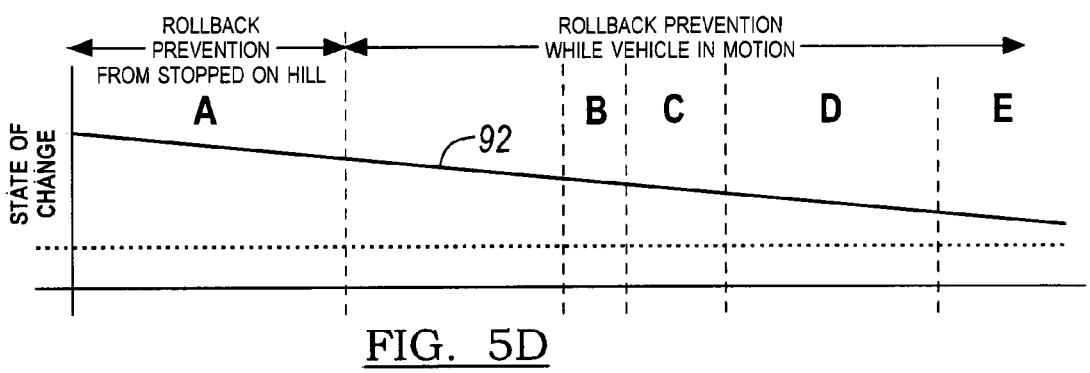

In FIGS. 5A-5D, at the start of phase A, the vehicle is stopped on an incline having a positive slope. The accelerator pedal position 80 increases initially as the operator demands wheel torque to ascend the incline. ERAD provides increasing torque to the wheels preventing rollback and later ERAD torque is held steady while vehicle speed is stable. The rate of change of accelerator pedal position 82 follows characteristically. Vehicle speed 88 and vehicle acceleration 90 are shown in FIG. 5C. The battery's SOC 92 is shown decreasing linearly as ERAD 22 draws electric power from battery 23.

In FIGS. 5A-5D, phases B, C, D and E represents the periods during which the vehicle is moving forward on an incline with increasing slope and ERAD torque 84 is used initially to move the vehicle on the incline. At the beginning of phase B, the vehicle decelerates because ERAD torque 84 is less than the road load 86, which increases due to the road slope increasing. At the beginning of phase C, the operator senses the vehicle deceleration and tips-in by depressing the accelerator pedal in order to accelerate the vehicle on the incline. CISG 18 is used to start the engine 14, which begins to produce positive engine torque 98 after a brief period, and wheel torque 100 increases. The increase in accelerator pedal rate and the concurrent decrease in vehicle acceleration cause the engine to start, at step 66 in FIG. 3. Wheel torque 100 exceeds road load 86 at the beginning of phase D due to the oncoming engine torque 98, thereby accelerating the vehicle on the incline.

In phase B, the vehicle begins to decelerate due to an increase in the road load with increasing grade. During phase C, the driver further tips into the accelerator to continue accelerating the vehicle up the grade. The control strategy infers an increasing accelerator pedal rate as an indication of increasing road load. The combination of increasing accelerator pedal rate and decreasing vehicle speed are used to infer that the operator is depressing the accelerator pedal in order to overcome an increase in slope of the grade, but that wheel torque sourced from the ERAD is inadequate to maintain vehicle acceleration. This provides the earliest indication of a rollback condition. These conditions indicate that ERAD torque 84 cannot meet the driver demanded torque due to the increasing road load 86. These conditions are checked because desired wheel torque does not compensate for increasing road load caused by increasing grade slope. Once these conditions are detected during phase C, the engine is started to prevent a vehicle rollback condition.

In phase D, the vehicle accelerates on the incline as engine 14 produces torque along with ERAD 22, as shown by the increased wheel torque above the road load. Finally, during phase E, ERAD torque 84 is blended off synchronously while engine torque 98 increases, thereby maintaining a constant wheel torque 100. This provides an undetected transition as the engine is used for vehicle propulsion while preventing vehicle rollback.

Figure 6A:
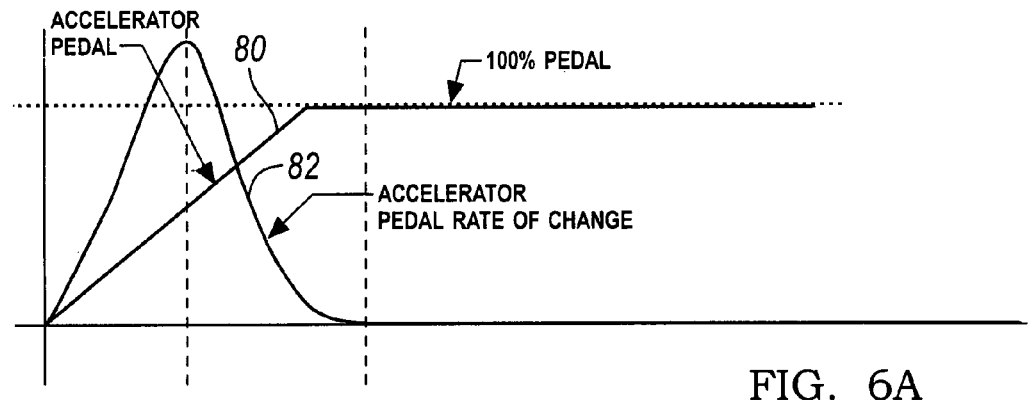
FIGS. 6A-6C show the variation over time of powertrain parameters while the demand for wheel torque is high and vehicle rollback is being controlled.
Figure 6B:
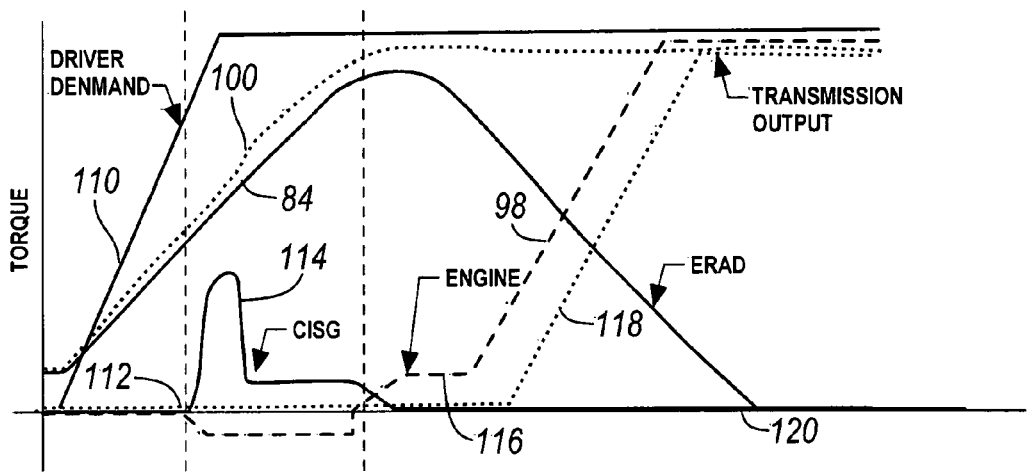
Figure 6C:
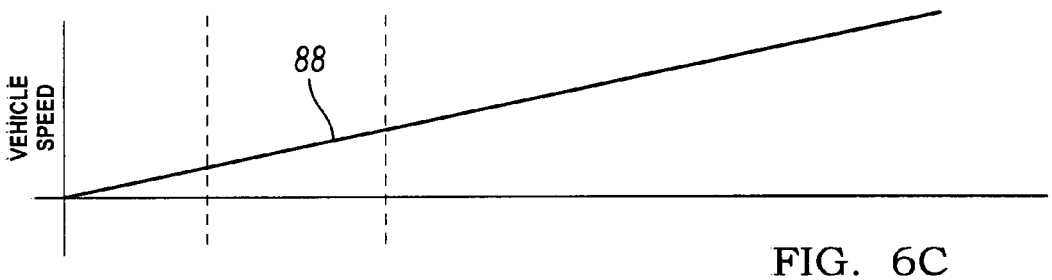

FIGS. 6A-6C shows the variation of powertrain parameters during vehicle rollback prevention when the operator initially and continually demands a large magnitude of wheel torque, as represented by accelerator pedal position 80 and its rate of change 82. Desired wheel torque 110 exceeds actual wheel torque 100 and ERAD torque 84. At 112, CISG 18 is used to start engine 14, which begins to produce positive engine torque 98 after a brief period. As shown in FIG. 6B, engine torque 98 preferably increases synchronously while CISG torque 114 decreases, thereby producing a smooth torque transition between those power sources. Engine torque 98 remains constant for a period 116. A delay in increasing transmission output torque occurs due to delay in filling, stroking and slipping the input clutch 40, 41, which transmits power through the gear in which transmission 14 is operating.

Engine torque 98 increases and is controlled to provide required torque to wheels. Vehicle speed 88 increases uniformly while the engine 14 is started, the input clutch 40, 41 of transmission 16 is engaged, and power is transmitted to the wheels 34, 35. ERAD torque 84 increases quickly causing the wheel torque at wheels 26, 27 to approach the required wheel torque when the operator initially demands a large magnitude of wheel torque, then is ramped down at a synchronous rate to the increase of engine torque to ensure smooth torque transition at the wheels. Thereafter, ERAD 22 is shutdown at 120.

Figure 7:
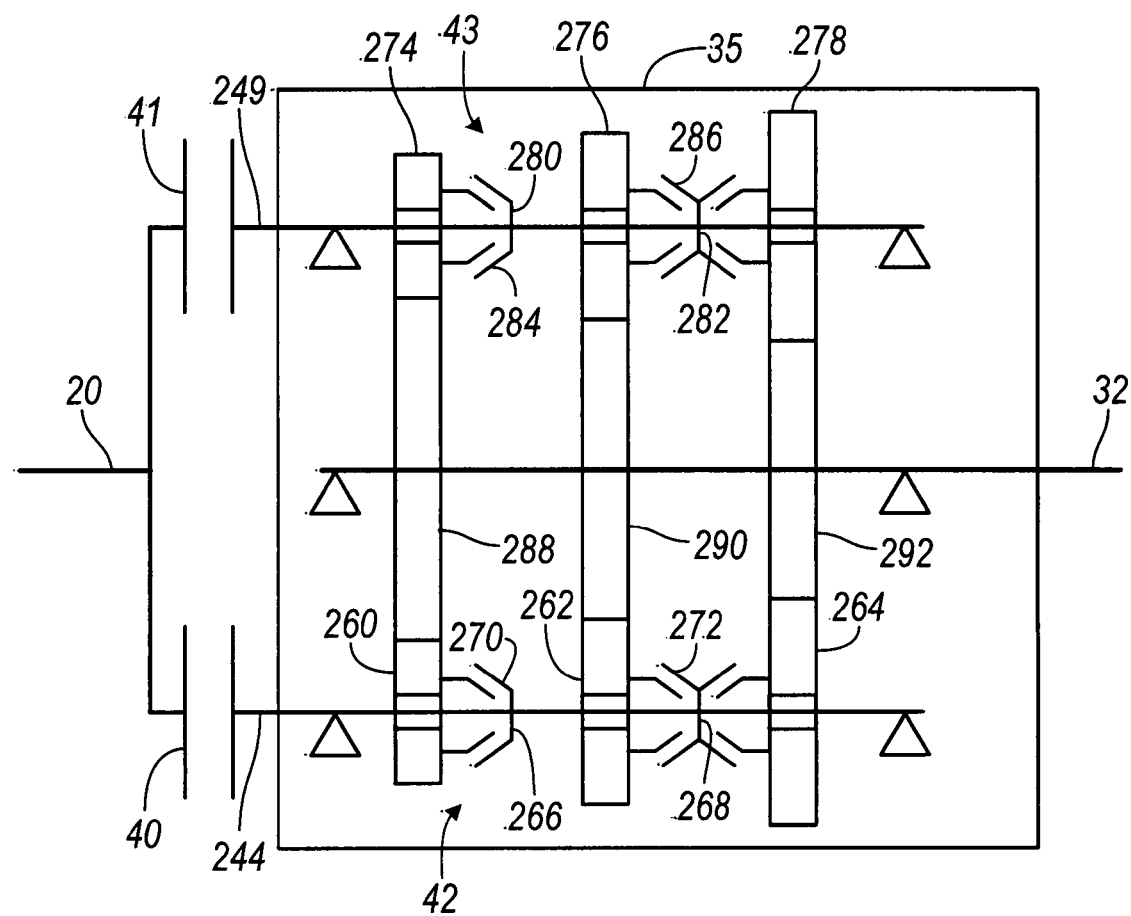
FIG. 7 is a schematic diagram of the kinematic arrangement of a powershift automatic transmission.

FIG. 7 illustrates details of a powershift transmission 16 including a first input clutch 40, which selective connects the input 20 of transmission 16 alternately to the even-numbered gears 42 associated with a first layshaft 244, and a second input clutch 41, which selective connects the input 20 alternately to the odd-numbered gears 43 associated with a second layshaft 249.

Layshaft 244 supports pinions 260, 262, 264, which are each journalled on shaft 244, and couplers 266, 268, which are secured to shaft 244. Pinions 260, 262, 264 are associated respectively with the second, fourth and sixth gears. Coupler 266 includes a sleeve 270, which can be moved leftward to engage pinion 260 and driveably connect pinion 260 to shaft 244. Coupler 268 includes a sleeve 272, which can be moved leftward to engage pinion 262 and driveably connect pinion 262 to shaft 244 and can be moved rightward to engage pinion 264 and driveably connect pinion 264 to shaft 244.

Layshaft 249 supports pinions 274, 276, 278, which are each journalled on shaft 249, and couplers 280, 282, which are secured to shaft 249. Pinions 274, 276, 278 are associated respectively with the first, third and fifth gears. Coupler 280 includes a sleeve 284, which can be moved leftward to engage pinion 274 and driveably connect pinion 274 to shaft 249. Coupler 282 includes a sleeve 286, which can be moved leftward to engage pinion 276 and driveably connect pinion 276 to shaft 249 and can be moved rightward to engage pinion 278 and driveably connect pinion 278 to shaft 249.

Transmission output 32 supports gears 288, 290, 292, which are each secured to shaft 32. Gear 288 meshes with pinions 260 and 274. Gear 290 meshes with pinions 262 and 276. Gear 292 meshes with pinions 264 and 278.

Couplers 266, 268, 280 and 282 may be synchronizers, or dog clutches or a combination of these.

Although the invention has been described with reference to a powershift transmission, the invention is applicable to any conventional manual transmission, automatic shift manual transmission, or automatic transmission that has no torque converter located in a power path between the engine and transmission input.

In accordance with the provisions of the patent statutes, the preferred embodiment has been described. However, it should be noted that the alternate embodiments can be practiced otherwise than as specifically illustrated and described.

What is claimed is:

1. A method for controlling a vehicle on an incline, comprising:
   (a) determining that accelerator pedal displacement exceeds a reference;

(b) if an electric machine connected to a load has a torque capacity able to produce a wheel torque that prevents rollback, using the electric machine to produce said wheel torque;

(c) if said torque capacity is absent, using an engine connected to the load and the electric machine to produce said wheel torque.

2. The method of claim 1 wherein step (a) further includes the step of using a speed of the vehicle and a position of an accelerator pedal to determine said wheel torque.

3. The method of claim 1 wherein the vehicle further includes an electric storage battery for supplying electric power to the electric machine, further comprising the steps of:

determining whether a state of charge of the battery is greater than a reference state of charge;

if the state of charge of the battery is greater than the reference state of charge, using the electric machine to produce said wheel torque; and if the state of charge of the battery is less than the reference state of charge, using the engine to produce said wheel torque.

4. The method of claim 1, further comprising the steps of:

determining whether a temperature of the electric machine is less than a reference temperature;

if the temperature of the electric machine is less than the reference temperature, using the electric machine to produce said wheel torque; and if the temperature of the electric machine is greater than the reference temperature, using only the engine to produce said wheel torque.

5. The method of claim 1, further comprising the steps of:

determining whether a rate of change of an accelerator pedal position is greater than a reference rate of change of pedal position;

if the rate of change of the accelerator pedal position is greater than the reference rate of change of pedal position, determining whether current acceleration of the vehicle is greater than a reference vehicle acceleration; and if the current acceleration of the vehicle is greater than the reference vehicle acceleration, using the electric machine to produce said wheel torque.

6. The method of claim 5, further comprising the steps of:

if the current acceleration of the vehicle is less than the reference vehicle acceleration, using the engine to produce said wheel torque.

7. The method of claim 1, further comprising the steps of:

using a rate of depression of an accelerator pedal and a magnitude of vehicle deceleration to indicate a need for an increase in wheel torque to prevent vehicle roll back; and increasing engine torque and decrease torque produced by the electric machine concurrently in response to said indication.

8. In a powertrain that includes an engine driveably connected to a load and an electric machine driveably connected to the load, a method for controlling a wheeled vehicle located on an incline against rollback comprising the steps of:

(a) determining a magnitude of torque at the wheels required to prevent the vehicle from rolling back;

(b) determining that accelerator pedal displacement exceeds a reference;

(c) determining whether the electric machine has a current torque capacity able to produce the required magnitude of torque at the wheels;

(d) if the current torque capacity of the electric machine is able to produce the required wheel torque, using the electric machine to produce the required wheel torque; and (e) if the torque capacity of the electric machine is unable to produce the required wheel torque, using the engine to produce the required wheel torque.

9. In a powertrain that includes an engine driveably connected to a load and an electric machine driveably connected to the load, a method for controlling a wheeled vehicle located on an incline against rollback comprising the steps of:

(a) determining a magnitude of torque at the wheels required to prevent the vehicle from rolling back;

(b) determining that accelerator pedal displacement exceeds a reference;

(c) determining whether the electric machine has a current torque capacity able to produce the required magnitude of torque at the wheels;

(d) if the current torque capacity of the electric machine is able to produce the required wheel torque and a temperature of the electric machine is less than a reference temperature, using the electric machine to produce the required wheel torque; and (e) if one of the torque capacity of the electric machine is unable to produce the required wheel torque and the temperature of the electric machine is greater than the reference temperature, using the engine to produce the required wheel torque.

10. In a powertrain that includes an engine driveably connected to a load and an electric machine driveably connected to the load, a method for controlling a wheeled vehicle located on an incline against rollback comprising the steps of:

(a) determining a magnitude of torque at the wheels required to prevent the vehicle from rolling back;

(b) determining that accelerator pedal displacement exceeds a reference;

(c) determining whether the electric machine has a current torque capacity able to produce the required magnitude of torque at the wheels;

(d) if the current torque capacity of the electric machine is able to produce the required wheel torque and if a temperature of the electric machine is less than a reference temperature, using the electric machine to produce the required wheel torque; and (e) if one of the torque capacity of the electric machine is unable to produce the required wheel torque and the temperature of the electric machine is less than the reference temperature, using the engine and the electric machine to produce the required wheel torque.

11. A system for controlling a vehicle located on an incline against rollback comprising:

an engine driveably connected to a load;

an electric machine driveably connected to the load; and a controller configured to determine a magnitude of wheel torque required to prevent the vehicle from rolling back, to determine that accelerator pedal displacement exceeds a reference, to use the electric machine to produce the required wheel torque provided the current torque capacity of the electric machine is able to produce the required wheel torque, and to use the engine and electric machine to produce the required wheel torque if the torque capacity of the electric machine is unable to produce the required wheel torque.

12. The system of claim 11, wherein the controller is further configured to start the engine if a rate of depression of an accelerator pedal is greater than a reference rate and a magnitude of vehicle deceleration is greater than a reference vehicle deceleration, and to transition from use of the electric machine to use of the engine to provide torque to the vehicle wheels.

13. The system of claim 11, wherein the controller is further configured concurrently to increase engine torque and to decrease torque produced by the electric machine in order to provide torque to the vehicle wheels. .

14. The system of claim 11, wherein the controller is further configured:
- to use a rate of depression of an accelerator pedal and a magnitude of vehicle deceleration to indicate a need for an increase in wheel torque to prevent vehicle roll back; and
- to increase engine torque and decrease torque produced by the electric machine concurrently in response to said indication.

\* \* \* \* \*